United States Patent

Case

[15] 3,671,470
[45] June 20, 1972

[54] RIGID POLYURETHANE COMPOSITIONS WITH IMPROVED PROPERTIES

[72] Inventor: Leslie C. Case, 14 Lockeland Road, Winchester, Mass. 01890

[22] Filed: April 27, 1970

[21] Appl. No.: 32,398

[52] U.S. Cl. ..............260/2.5 AP, 260/2.5 AQ, 260/9 R, 260/75 NQ, 260/77.5 AN, 260/77.5 AQ, 260/DIG. 24
[51] Int. Cl. ..............C08g 22/06, C08g 22/08, C08g 22/44
[58] Field of Search............260/2.5 AP, 2.5 AQ, 77.5 AQ, 260/77.5 AN, 75 NQ

[56] References Cited

UNITED STATES PATENTS

| | | | |
|---|---|---|---|
| 3,378,527 | 4/1968 | Case et al. | 260/67 |
| 3,502,601 | 3/1970 | Case et al. | 260/2.5 |
| 3,309,342 | 3/1967 | Friedman | 260/77.5 |
| 3,436,373 | 4/1969 | Cox et al. | 260/77.5 |

*Primary Examiner*—Donald E. Czaja
*Assistant Examiner*—Ronald W. Griffin

[57] ABSTRACT

Polyurethane formulations based on a polyol component which incorporates a hydroxyalkyl-substituted Mannich condensation product and a substantial quantity of cyclic hydrocarbon radicals are described. Such formulations yield rigid polyurethane foams which exhibit unusual inherent flame retardancy and exceptionally good dimensional stability under adverse conditions of temperature and humidity.

35 Claims, No Drawings

RIGID POLYURETHANE COMPOSITIONS WITH IMPROVED PROPERTIES

CROSS-REFERENCES TO RELATED APPLICATIONS

This application is related to U. S. Pat. application Ser. No. 611,826, filed Jan. 26, 1967, now U.S. Pat. No. 3,502,601 issued Mar. 24, 1970.

BACKGROUND OF THE INVENTION

1. Field of the Invention

This invention is concerned with novel polyurethane formulations, and with improved rigid polyurethane foams prepared therefrom. In particular, this invention is concerned with rigid polyurethane foams derived from nitrogen-containing polyol components which are characterized by having a significant proportion of cyclic hydro-carbon radicals and secondary or tertiary nitrogen atoms in the form of N(hydroxyalkyl)-substituted aminomethyl groups attached to a hydroxyalkyl-substituted aromatic nucleus.

2. Description of the Prior Art

Rigid polyurethane foams have attained wide commercial use in recent years. These foams are conventionally prepared by coreacting an organic polyisocyanate and a polyfunctional hydroxy-terminated compound, commonly referred to as a polyol, in the presence of a blowing agent, and a great many suitable reactants and formulations are known. The polyol component may consist of a single polyol or a mixture of two or more different polyols. Polyols most frequently employed in polyurethane formulations belong to the broad classes of polyether polyols and polyester polyols and the preparation of many representatives of such polyols is well documented in the art. In order to be useful in commercial polyurethane formulations such polyols must be compatible with the other components of the formulation such as the polyisocyanate component and the blowing agent, and they also should desirably possess viscosities which are sufficiently low at or near room temperature to be readily and thoroughly miscible with these other components. Such ready miscibility and compatibility are essential for the production of good quality foams with uniform pore structure. These requirements of good compatibility and useful viscosity impose, however, serious limitations on the reactants which can be employed to form useful rigid polyurethane foams. In addition to these essential components the polyurethane formulation will also generally contain in relatively small amounts catalysts, surfactants, emulsifiers, foam stabilizing agents, fillers and other additives. Such substances are employed to accelerate the rate of reaction between the isocyanato groups and the hydroxyl radicals, to control the cell size and porosity, and to obtain other desirable effects and properties.

The physical properties of polyurethane foams are very important in commercial applications, and while in conventional state-of-the-art foams many of these properties are satisfactory for a number of uses, there are several foam characteristics which remain in need of further improvement in order to eliminate undesirable shortcomings in present applications, and in order to expand the scope of utility of polyurethane foams. Especially objectionable is the flammability and combustibility of ordinary polyurethane foams and it has limited, and in some instances entirely prevented, the use of these materials in the building and transportation industries. The prior art therefore describes attempts to provide compositions with improved resistance to ignition and flame-propagation. Specifically, the use of additives such as compounds of phosphorus, antimony and bismuth in the formulation to impart flame resistance to the resulting foam has been described. Many of these additives are quite toxic, however, and in addition they are often immiscible with, or difficultly dispersable in, the other components of the formulation affecting adversely the physical properties of the final foam. The incorporation of phosphoro, and especially of chloro or bromo radicals as an integral part of the polyol structure has also been found to be very effective in increasing the flame-resistance of the cross-linked polyurethane compositions prepared therefrom and is described in numerous publications. Unfortunately, however, rigid polyurethane foams derived from halo-substituted polyols usually exhibit a very objectionable lack of dimensional stability when subjected to changes in temperature and environmental humidity. Specifically one difficulty frequency encountered is the tendency of the foam to distort and shrink upon exposure to low temperatures. This irreversible contraction in volume is generally referred to as cold shrinkage and results in loss of insulating power since the foam when contracting separates from its containing walls giving rise to blank spaces which can fill up with air, a relatively good thermal conductor, and permit convection currents to take place. Likewise such polyurethane foams are well known to expand irreversibly in volume to a considerable degree when subjected to elevated temperatures and high humidity. This expansion results in a loss of insulating power due to rupture of the closed rigid foam cells and conversion of the rigid foam into an open-cell sponge. This undesirable phenomenon can also lead to distortion and deformation, and even rupture, of the boundary walls containing the foam. In order to determine the degree of expansion to be expected from a foam under hot, humid conditions, samples of the foam are generally subjected to an accelerated humid-aging test in which they are exposed to elevated temperatures and 95–100 percent relative humidity for a fixed period of time. The increase in volume observed upon humid aging is exceptionally large for foams derived from polyols with high equivalent weights, such as halo-substituted polyols in which the high molecular weight of the halogen substituent contributes to a high equivalent weight. Thus currently available rigid polyurethane foams which utilize halo-substituted polyols in amounts sufficient to achieve good flame retardancy exhibit exceeding poor dimensional stability with volume expansions of 20 to 30 percent or more being observed upon humid aging. This objectional volume expansion also increases rapidly with decreasing density of the foam, regrettably so, since such lower density foams would be very advantageous from a cost point of view, especially if the relatively expensive halo-substituted polyols are employed.

SUMMARY OF THE INVENTION

I have now discovered that rigid polyurethane foams with an extraordinarily high degree of inherent flame retardancy and with exceptionally good dimensional stability can be obtained if the polyol component of the polyurethane formulation contains two essential structural units in specific proportions. The structural units the presence of which I have found to be essential in the polyol component in order to achieve the results of the present invention are (X) cyclic hydrocarbon radicals, hereinafter referred to as —RING— radicals, selected from the group consisting of aromatic, partially or fully saturated cycloaliphatic and heterocyclic radicals having at least six carbon atoms and from zero to six halo substituents selected from the group consisting of chloro, bromo, and iodo radicals, and (Y) N-substituted amino-methyl radicals attached to a phenolic residue in the ortho or para position, said radicals being identical to those present in a Mannich condensate and having the formula

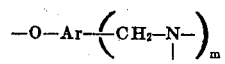

wherein $m$ is an integer with a value varying from one to three and Ar is an aromatic radical carrying an N-substituted aminoethyl group in the ortho or para position to a phenolic oxygen with the phenolic oxygen and the amino nitrogen carrying substituents selected from the group consisting of

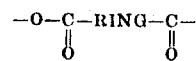

radicals and —(R—O)$_n$— radicals wherein R is a lower alkylene radical selected from the group consisting of 1,2-alkylene radicals and 1,3-alkylene radicals and n is an integer having a value of at least one and generally not more than about 2, and RING has the above-assigned meaning. For purposes of this specification and claims the tertiary aryl-alkyl amino structural unit (Y) as defined hereinabove will be referred to as a Mannich radical. The RING radicals will frequency be identical with those in an aromatic or cycloaliphatic 1,2-dicarboxylic acid of the general formula

in which the carboxylic acid radicals are attached directly to the cyclic hydrocarbon ring. The above-identified structural units (X) and (Y) may both be present in one single polyol in chemical combination or they may be obtained as a result of physically admixing two or more different polyols with the structural units (X) and the structural units (Y) being present in the separate polyols. Polyol components suitable for preparing the polyurethanes of the present invention will contain at least 0.4 and generally not more than 3.0 cyclic hydrocarbon radicals per kilogram of polyol component and advisably should contain from about 1.0 to 2.5 (Y) units per kilogram of polyol component. The novel polyurethanes of the present invention are prepared according to procedures well documented in the art, by coreacting the polyol component with organic polyisocyanates having at least two isocyanate groups, desirably in the presence of catalysts, and depending on the type of polyurethane composition desired, in the presence of blowing agents, surfactants and other additives. These polyurethanes are particularly desirable when prepared in the form of rigid tough non-elastic foams and my invention is based on the discovery that polyols with the proper combination of the two structural units described hereinabove quite unexpectedly and surprisingly result in rigid polyurethane foams which exhibit a flame retardancy greater than and a volume expansion upon humid aging lower than that of polyurethane forms prepared from polyols which possess only one of these structural units. This synergistic effect which I have discovered permits the preparation of highly flame-retardant polyurethane foams with excellent dimensional stability at densities which are lower than conventional densities and thus results in a cost saving. The polyurethanes of the present invention may also be prepared in the form of hard, tough flame-retardant coatings and rigid, tough flame-retardant castings.

Polyols useful in preparing polyurethane compositions in accord with the present invention possess hydroxyl functionalities ranging from at least two to about seven, and preferably from at least three to about five, that is, the number of hydroxyl radicals per polymer molecule should be at least two, and preferably at least three, and will generally not be more than seven and frequently not be more than five. The number-average molecular weight of suitable polyols will range from at least 300, and preferably at least 400, to generally not more than 1,250, and the hydroxyl equivalent weight, that is, the molecular weight per chain end will vary from at least 90, and preferably from at least 100 to about 250. Suitable polyols are further characterized by having an acid number of less than five, and usually less than two. The acid number is the number of milligrams of potassium hydroxide necessary to neutralize the acidity of one gram of polyol.

Polyols which incorporate both essential structural units in chemical combination in one molecule are fusible, soluble polymers with a hydroxyl functionality of at least three and are characterized by having a central core consisting essentially of the residue M of a Mannich condensate of the general formula MH$_3$ where H is an active hydrogen radical, and having attached to said central core M through ether and ester and/or amide linkages linear hydroxyl-terminated polymer branch chains composed of radicals of the general formula —O—R— and

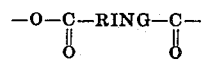

, wherein R and RING have the above-assigned meaning.

One method of preparing polyols suitable for use in the polyurethane compositions of this invention comprises coreacting (1) a cyclic monoether selected from the group consisting of monoepoxides and monooxetanes, (2) a cyclic monoanhydride of an organic polycarboxylic acid selected from the group consisting of aromatic, partially or fully saturated cycloaliphatic and heterocyclic polycarboxylic acids having at least eight carbon atoms, and (3) a polymerization starter selected from the group consisting of Mannich condensation products derived from the reaction of (a) formaldehyde and linear and cyclic polymers thereof, (b) a phenol, and (c) a nitrogen-containing compound selected from the group consisting of lower aliphatic monoalkanolamines and lower aliphatic dialkanolamines. Oxyalkylation of said Mannich condensates and admixtures of said Mannich condensates with aliphatic polyalcohols having from three to six carbon atoms and from three to six hydroxyl groups may also be employed as polymerization starters.

Another method of obtaining polyols suitable for use in the present invention involves physically admixing (A) a polyol having nitrogen present in the form of from one to three N-disubstituted aminomethyl groups attached to an aromatic nucleus carrying at least one hydroxyalkylene ether substituent of the general formula —O—(R—O)$_m$—H wherein R has the above-assigned meaning and m is an integer having a value of at least one, and (B) a cyclic-hydrocarbon-radical-containing polyol. Such physically blended polyol components will, quite unexpectedly, result in a better combination of dimensional stability and flame retardancy of the polyurethane composition than can be obtained with either polyol constituent alone. Polyols of type (A) comprise the Mannich condensates of a phenol, alkanolamines selected from the group consisting of lower aliphatic monoalkanolamines and lower aliphatic dialkanolamines, and formaldehyde or its polymers, and the oxyalkylation products of such Mannich condensates with saturated lower aliphatic epoxides. Polyols of type (B) comprise hydroxyl-terminated polyesters and polyether-esters derived from aromatic, cycloaliphatic and heterocyclic polycarboxylic acids or anhydrides, and oxyalkylation products of formaldehyde and phenols and formaldehyde and aromatic amines.

While any of the materials encompassed by the classes described herein-above may be employed to prepare polyols suitable for preparation of polyurethanes within the scope of the present invention, the preferred modes of operation will be described in detail herein-below.

DESCRIPTION OF THE PREFERRED EMBODIMENTS

In the preparation of the polyurethane compositions of this invention it is essential that the structural units (X) and (Y), i. e., RING radicals and Mannich radicals are both present in the polyol portion employed to form the polyurethane. Preferred compositions are those in which RING is 1,2-phenylene, tetrachloro-1,2-phenylene, tetrabromo-1,2-phenylene, 1,4,5,6,7,7-hexachloro-(2,2,1)bicyclo-2,3-heptenylene-5, 1,4,5,6,7,7-hexabromo-(2,2,1) bicyclo-2,3-heptenylene-5, 5,6,7,8,9,9-hexachloro-5,8-methanooctahydro-2,3-naphthylene, tetrahydro-1,2-phenylene and its haloaddition products, cis-3,6-endo-methylene-1,2,3,6-tetrahydro-1,2-phenylene and its haloaddition products, and methyl-(2,2,1)-bicyclo-2,3-heptenylene-5 and its haloaddition products. Useful cyclic hydro-carbon radicals will have at least six and generally not more than twelve carbon atoms and from zero to six halo-substituents selected from the group consisting of chloro, bromo and iodo radicals. Especially preferred are cyclic hydrocarbon radicals having at least one, and more preferably at least two halo substituents selected from the group consisting of chloro and bromo radicals.

Suitable Mannich radicals are those in which the aromatic radical Ar has at least six and generally not more than fourteen carbon atoms and from zero to three substituents selected from the group consisting of chloro, bromo and iodo radicals. Examples of preferred Mannich radicals are those in which the aromatic radical Ar is derived from phenol and halo-substituted phenols, such as 4-chlorophenol, 4-bromophenol, 2,4-dichlorophenol and 2,4-dibromophenol, and naphthols, such as alpha-naphthol and beta-naphthol. Alkyl phenols, such as t-butyl phenol and nonyl phenol, may also be used. Particularly preferred Mannich radicals are those in which Ar is phenyl or substituted phenyl.

In order to achieve the synergism in properties which forms the basis of the present invention it is further critical that these radicals are present in the proper proportions. For best humid aging the polyol component of the polyurethane formulation should contain about 0.5 to 3.0 gram radicals of RING per kilogram of polyol component and from about 1.0 to about 2.5 Mannich gram radicals per kilogram of polyol component. For purposes of the present specification and claims the entire amount of polyol employed to form the polyurethane composition will be referred to as the polyol component, and it is to be understood that this polyol component may be composed of one individual polyol or may consist of a mixture of two or more individual polyols. If the polyol component of the polyurethane formulation consists of more than one polyol, the individual members of such a polyol mixture will be referred to as the constituents of the polyol component. Best flame resistance is generally realized when the polyurethane polyol component contains from about 1.0 to 2.5 Mannich gram radicals per kilogram of polyol component and from about 0.5, and more preferably, from about 0.75 to 1.50 RING gram radicals per kilogram of polyol component if said RING radicals are selected from the group consisting of cyclic hydrocarbon radicals having at least six carbon atoms and one or two halogen ring substituents, and from 0.4, and more preferably from 0.5 to 0.8 RING gram radicals if said RING radicals are selected from the group consisting of cyclic hydrocarbon radicals having at least six carbon atoms and at least three halo substituents, with said halo substituents being selected from the group consisting of chloro, bromo, and iodo radicals.

In one embodiment of the present invention the combination of radicals (X) and (Y) is achieved by chemically incorporating both into one polyol. One especially preferred mode of preparing suitable polyols utilizes the process described in U. S. Pat. No. 3,483,169. Thus useful polyols are conveniently prepared by coreacting (1) a cyclic monoether selected from the group consisting of monoepoxides and monooxetanes, (2) a cyclic monoanhydride of an organic dicarboxylic acid selected from the group consisting of aromatic and cycloaliphatic dicarboxylic acids having at least eight carbon atoms and having both carboxylic acid groups attached directly to a carbocyclic hydrocarbon radical, preferably in adjacent ring positions, and (3) a polymerization starter having at least three active hydrogen atoms and being selected from the group consisting of Mannich condensation products derived from the reaction of (a) formaldehyde and linear and cyclic polymers thereof, (b) a nitrogen-containing compound selected from the group consisting of lower aliphatic monoalkanolamines and lower aliphatic dialkanolamines, and (c) phenols, oxyalkylation products of said Mannich condensation products, and mixtures of said Mannich condensation products with alcohols selected from the group consisting of aliphatic polyalcohols having from three to six carbon atoms and from three to six hydroxyl groups and aminoalcohols having from 4 to 12 carbon atoms, and from three to 6 active hydrogen atoms.

The cyclic ether, the cyclic monoanhydride and the polymerization starter are preferably coreacted within a temperature range varying from room temperature and more preferably from about 50° C. to generally not more than 150° C., and frequently not more than 125° C. The copolymerization is advisably conducted in a closed system and frequently at superatmospheric pressure, such as autogeneous pressure. Suitable pressures will generally range from about 30 pounds per square inch (p. s. i.) to about 500 p. s. i., and will often not exceed 150 p. s. i. The reaction can be effected batch-wise, in a closed vessel, such as an autoclave equipped with agitation, or under continuous condition in a tubular reaction at elevated temperature and pressure. The copolymerization is conveniently carried out by combining all three reactants and heating them together at elevated temperature and pressure for a length of time sufficient to complete the reaction. The process does not require the use of a catalyst. Strong acids, however, have been found to act as catalysts and if anhydrides derived from strong acids are used as reactants, the process becomes autocatalytic. Other useful catalysts which may be employed in preparing the instant polyols are those described in U. S. Pat. No. 3,382,217. It should be noted in this regard that, in order to produce polyols having acceptably low viscosities and reasonably good compatibilities with the other polyurethane formulation ingredients, that it is essential during the period in which unreacted free anhydride is present in the reaction mixture to avoid the presence of strongly basic catalysts, such as inorganic hydroxides of alkali and alkaline earth metals, oxides of these metals and quaternary ammonium hydroxides.

Cyclic monoethers which are desirable in preparing the polyurethane polyols of the present invention comprise 1,2-alkylene oxides, generally known as epoxides and 1,3-alkylene oxides, generally known as oxetanes or trimethylene oxides. Preferred for use are saturated lower aliphatic terminal monoepoxides having from two to six carbon atoms and from zero to three halogen substituents selected from the group consisting of chloro and bromo radicals, and having the general formula

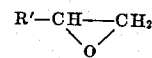

wherein R' is a radical selected from the group consisting of hydrogen, lower aliphatic alkyl radicals and lower aliphatic haloalkyl radicals. Representative epoxides which are preferred for use in the present invention are ethylene oxide, propylene oxide, 1,2-butylene oxide, 3-chloro-1,2-propylene oxide, also known as epichlorohydrin, and 3-bromo-1,2-propylene oxide, also known as epibromohydrin. Especially preferred for use in the present invention are ethylene oxide and propylene oxide. Propylene oxide is most preferred. Suitable oxetanes will have from three to ten carbon atoms and from zero to six halogen substituents from the group consisting of chloro and bromo radicals. Examples of useful oxetanes are trimethylene oxide or oxetane itself, 3,3-dimethyloxetane, 3,3-bis (chloromethyl) oxetane, 3,3-bis(bromomethyl) oxetane, and the like. Mixtures of cyclic monoethers may be employed. Especially useful are mixtures of two or more epoxides.

Preferred cyclic polycarboxylic acid monoanhydrides are those having at least eight carbon atoms and from zero to six halo-substituents selected from the group consisting of chloro, bromo and iodo radicals. Especially preferred for use are cyclic dicarboxylic acid monoanhydrides derived from dicarboxylic acids having the carboxylic acid radicals attached in adjacent positions directly to a cyclic hydrocarbon ring.

Representative of the cyclic monoanhydrides which are very useful in the present invention are phthalic anhydride, 3,4,5,6-tetrachlorophthalic anhydride, 3,4,5,6-tetrabromophthalic anhydride, and 1,4,5,6,7,7-hexachlorobicyclo-(2,2,1)-5-heptene-2,3-dicarboxylic acid anhydride (hereinafter referred to as Chlorendic anhydride) 2,2'-diphenylene dicarboxylic acid anhydride (hereinafter referred to as diphenic acid anhydride), 5,6,7,8,9,9-hexachloro-1,2,3,4,4a,5,8,8a-octahydro-5,8-methano-2,3-naphthalene dicarboxylic anhydride (hereinafter referred to as Chloran), hexahydrophthalic anhydride, endo-cis-bicyclo-(2,2,1)-5- heptene-2,3-dicarboxylic acid anhydride (also known as Nadic anhydride), its methyl-substituted derivatives, (also known as Methyl Nadic anhydride), monobromocyclohexane-1,2-dicarboxylic acid anhydride, 4,5-dibromocyclohexane-1,2-dicarboxylic acid anhydride, 4,5-dichlorocyclohexane-1,2-dicarboxylic acid monoanhydride, 5,6-dibromonorbornane-2,3-dicarboxylic acid anhydride, and 5,6-dichloronorbornane-2,3-dicarboxylic acid anhydride. Also useful are other bicyclic and polycyclic adducts of maleic anhydride or tetrahydrophthalic anhydride with cyclic aliphatic diolefins, such as cyclopentadiene, hexachlorocyclopentadiene and hexabromo-cyclopentadiene. Particularly preferred for use in the present invention are those anhydrides in which one or more ring hydrogens are substituted by halogen. Halo-substituted anhydrides may be employed directly in the formation of the polyol or the halo-substitution may be accomplished by the process described in Application Ser. No. 878,895, now U.S. Pat. No. 3,624,012 issued Nov. 30, 1971, by addition of halogen to a hydroxyl-terminated polymer which has unsaturated cyclic hydrocarbon radicals incorporated therein. Mixtures of two or more of these cyclic dicarboxylic acid anhydrides can, of course, be utilized.

The polymerization starters are prepared by a condensation reaction generally known, and referred to in the art as the Mannich reaction, from formaldehyde, a phenolic compound, and a nitrogen-containing compound selected from the group consisting of lower aliphatic alkanolamines and lower aliphatic dialkanolamines. Especially preferred are Mannich condensates derived from formaldehyde, phenol and halo-substituted phenols, and lower aliphatic monoalkanolamines and/or dialkanolamines. In the preparation of useful Mannich condensates linear and cyclic polymeric modifications of formaldehyde, such as trioxane or paraformaldehyde, and aqueous solutions of formaldehyde known and sold under the tradename of Formalin may be employed as a source of formaldehyde, and it is to be understood that for the purpose of the present invention and the claims, the term formaldehyde should be interpreted to include these polymeric forms.

Phenolic compounds suitable for preparing Mannich condensation products useful as polymerization starters can be monocyclic aromatic, polycyclic aromatic, or heterocyclic aromatic. Suitable phenols will have at least six, and generally not more than twenty-four, carbon atoms, from one to three hydroxyl radicals attached directly to the aromatic nucleus, from zero to four halo substituents selected from the group consisting of chloro and bromo radicals and at least one hydrogen radical in a ring position ortho or para to a phenolic hydroxyl radical. Iodo-substituted phenols may also be of use in some instances. Phenols having more than twenty-four carbon atoms may be employed if the viscosity of the final polyol does not become undesirably high. Suitable phenols may carry other substituents which are non-reactive under conditions employed in the Mannich condensation, such as alkyl radicals, haloalkyl, hydroxyalkyl, or alkoxy radicals, however, the reactivity in the Mannich condensation of thusly substituted phenols will frequently be quite low. Examples of useful phenols are phenol, 4-chlorophenol, 4-bromophenol, 2,4-dichlorophenol, 2,4-dibromophenol, 1,2-dihydroxybenzene or catechol, 1,4-dihydroxybenzene or hydroquinone, 1,3-dihydroxy-benzene or resorcinol, alpha-naphthol, beta-naphthol, and 4,4'-dihydroxybiphenol. Other useful phenols can be represented by the general formula

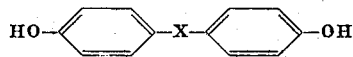

wherein X can be a radical selected from the group consisting of —O—, —S—, —SO$_2$—, —NH—,

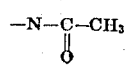

, and others. Specific examples of such phenols are 4,4'-oxybis-(phenol), 4,4'-thiobis-(phenol), 4,4'-oxybis-(2-chlorophenol), 4,4'-oxybis-(2-bromophenol) and others. Phenolic compositions derived from natural sources, such as pine tar resins, lignin extracts, etc. are also useful.

Examples of preferred lower aliphatic alkanolamines are monoethanolamine, diethanolamine, propanolamine, dipropanolamine, isopropanolamine, diisopropanolamine, 2-amino-1-butanol, hydroxy-ethylmethylamine and N-hydroxyethylbutylamine.

The Mannich condensate polymerization starters are prepared according to known procedures readily available in the art. The Mannich reaction is a well known reaction in organic chemistry and the general and specific preparation of aminomethyl derivatives via the Mannich reaction has been described and reviewed extensively in various publications. For example, a comprehensive review of the Mannich reaction and the preparation of Mannich condensates can be found in Chapter 10 of Organic Reactions, Volume I, pages 303–341, J. Wiley and Sons, New York, 1942. Another detailed review is provided by B. Reichert in 'Die Mannich Reaktion' published by Springer Verlag, Berlin, 1959. Other less extensive, yet useful, references are J. R. Meadow and E. E. Reid, J. Am. Chem. Soc. 76, 3479 (1954) and W. J. Burke, ibid., 71, 609 (1949). To prepare the Mannich condensate the formaldehyde, the amine or aminoalcohol, and the phenol may be combined together or the formaldehyde may be slowly added to a mixture of the other two reactants over a period of time. Solvents, such as water or alcohols, are suitably used, although excess reactants may be employed for the same purpose if desired. The reaction generally takes place at room temperature and is sufficiently exothermic to make cooling of the reaction mixture advisable. When the exothermic reaction subsides, the reaction may be driven to completion by heating under reflux for a period varying from a few minutes to several hours, depending on the reactants, at temperatures which will range from about 75° C. to not more than 150° C., and preferably not more than about 125° C. Since Mannich condensates decompose at elevated temperatures it is essential that the reaction mixture not be heated above this decomposition point. Also the reaction between phenols and formaldehyde to form novolaks is promoted at elevated temperatures and the temperature of the Mannich reaction mixture is frequently kept below the temperature of novolak formation, especially during the first stages of the reaction. When the reaction is completed, water and any excess reactants or solvent are removed, conveniently by stripping them off under vacuum. In order to be useful as polymerization starters in the subsequent preparation of polyols suitable for this invention, the Mannich condensate should advisably be free of any water. The crude Mannich reaction product, which usually consists of a mixture of isomers, may be employed as such without further fractionation, or the individual components may be isolated, if desired. It is sometimes desirable to employ in the preparation of the Mannich condensate the nitrogen-containing compound in the form of its acid salt, especially the hydrohalide salts. If such salts are employed, the reaction mixture will contain the corresponding salt of the Mannich condensate and it will be necessary to neutralize the reaction mixture, separate the Mannich condensate, desirably by extraction into an organic solvent and subsequently remove the solvent to isolate the Mannich condensate.

For the preparation of suitable polymerization starters the phenolic compound, the alkanolamine and the formaldehyde are preferably employed in molar proportions of about 1: 0.5–2.0:1.0.–Especially preferred starters are Mannich condensates having a molar ratio of phenol : alkanolamine : formaldehyde of 1:1:1, 1:2:2, and 2:1:2.

Also suitable as polymerization starters are the hydroxy-alkylated derivatives of such Mannich condensates. These materials are readily available by the addition of lower aliphatic epoxides to the Mannich condensate. Such an alkoxylation reaction is conducted according to procedures described in the art, generally within a temperature range of about room temperature to 200° C., and frequently about 75° C. to about 125° C., and it requires no added catalyst since the Mannich condensate exhibits catalytic activity in this reaction.

Admixtures of Mannich condensates as prepared hereinabove with hydroxyalkylated derivatives, or with aliphatic polyalcohols or aminoalcohols are also quite useful. Admixtures of Mannich condensates and aliphatic polyalchools having from three to six carbon atoms and from three to six hydroxyl groups are especially preferred. Also very preferred are mixtures of Mannich condensates with lower aliphatic aminoalcohols, such as triethanolamine and triisopropanolamine.

In the preparation of suitable polyurethane polyols the molar ratios of cyclic ether to polymerization starter employed will generally range from about 1.5 to 10 and more preferably from about 2.0 to 7, and the molar ratio of cyclic monoanhydride to polymerization starter will vary from 0.1 to 1.0, and more preferably from about 0.25 to 0.75. In the preferred polyols the amount of Mannich condensate residues which are chemically combined will usually amount to about ten per cent, and more frequently to about twenty per cent by weight of the polyol, and will generally not exceed about eighty, and more preferably about seventy per cent by weight. The anhydride residues will constitute at least ten per cent by weight and will generally be not more than about fifty per cent by weight of the polyol. The cyclic ether residues which become chemically combined will constitute at least ten and generally not more than forty per cent by weight of the polyol.

Polyols containing both radicals (X) and (Y) incorporated into one hydroxyl-terminated polymer may also be prepared according to the teachings of U.S. Pat. No. 3,378,527, by coreacting an aldehyde with the aforesaid Mannich polymerization starter, and the cyclic ethers and cyclic dicarboxylic acid monoanhydrides described hereinabove. Preferred for use are lower aliphatic monoaldehydes.

In another preferred embodiment of the present invention the proper combination of radicals (X) and (Y) is achieved by admixing individual polyols which have incorporated RING radicals, or Mannich radicals, respectively. Especially preferred are binary mixtures in which one polyol constituent has incorporated RING radicals, the other Mannich radicals. Polyurethane polyol components which are composed of a physical admixture of two or more individual polyol constituents will generally contain from about 50 to 90 percent, and more preferably from about 55 to 80 percent by weight, based on the weight of the total polyol component, of a polyol constituent having RING radicals incorporated and from about 10 to 50 percent, and more preferably from about 20 to 45 per cent by weight, based on the weight of the total polyol component, of a Mannich radical-containing polyol constituent.

A variety of RING-containing polyols which may be employed in the present invention will occur to those skilled in the art. Suitable polyols will preferably have hydroxyl functionalities of from three to six and will have an average of 0.25 to 1.0 cyclic hydrocarbon radicals per hydroxyl group incorporated into the main polymer chains, and they are further characterized by having molecular weights ranging from about 350, to about 1,000, and more preferably to about 700, equivalent weights varying from about 100, and more preferably from about 110 to generally not more than 250, and more preferably not more than 225, and acid numbers of less than five. In general, RING radicals are most conveniently incorporated into a polyester polyol as residues of a carboxylic polycarboxylic acid of the general formula

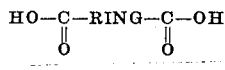

Reactants which are particularly useful for introducing such residues are the cyclic monoanhydrides of 1,2-dicarboxylic acids which have carboxylic acid groups attached to the carboxylic ring in adjacent positions. Preferred polyols are prepared by the addition polymerization of compounds having at least three active hydrogen atoms with the lower aliphatic cyclic ethers and the cyclic polycarboxylic acid monoanhydrides described hereinabove. Suitable active hydrogen compounds may be organic or inorganic and they should have at least three active hydrogen atoms, and the active hydrogens may be attached to oxygen, sulfur, or nitrogen and can be present in the form of hydroxyl, carboxyl, sulfhydryl, or amino radicals. Preferred active hydrogen-containing compounds are selected from the group consisting of aliphatic polyalcohols, polymercaptans, polycarboxylic acids, hydroxycarboxylic acids, mercaptocarboxylic acids, thioacids, phenols, polysaccharides, aminoalcohols, primary and secondary amines and mixtures of any of these compounds. Especially preferred for use are aliphatic polyalcohols having from three to six carbon atoms and from three to six hydroxyl groups and aminoalcohols having from four to 12 carbon atoms and from two to three hydroxyl groups and mixtures of polyalcohols and aminoalcohols. The cyclic ether, the cyclic polycarboxylic acid monoanhydride and the active-hydrogen-containing compound are preferably coreacted together in the manner and in the proportions described in detail in U. S. Pat. Nos. 3,483,169, 3,382,217, and 3,454,530, all of which are hereby incorporated by reference. A stepwise mode of reaction in which the anhydride is first reacted with the active-hydrogen compound and the adduct is subsequently reacted with the cyclic ether may also be employed in some instances, although it is less desirable since problems of excessive viscosity and undesirable compatibility frequently arise. The polycondensation reaction of carbocyclic 1,2-dicarboxylic acids with glycols in the presence of tri- or higher functionality alcohols may also be used, but can result in compositions which are undesirable because of excessive viscosity and poor compatibility with fluorocarbon blowing agent. Very suitable RING-containing polyol constituents may also be prepared according to U. S. Pat. No. 3,378,527 by coreacting an aldehyde with the cyclic ether, cyclic polycarboxylic acid monoanhydride, and polymerization starter, as described herein-above.

Examples of other suitable RING-containing polyol constituents are oxyalkylated condensation products of formaldehyde and phenols. The condensates are generally known in the art as novolacs and as resoles. The former are the result of a base-catalysed condensation of formaldehyde and a phenol and are soluble, fusible polymers in which the phenolic radicals are connected by methylene bridges randomly in the ortho and para positions of the aromatic nuclei, and the latter are phenolalcohols resulting from the acid-catalyzed condensation of formaldehyde and phenol. Experimental procedures for preparation of many phenol-formaldehyde condensates, including both novolacs and resoles are given in 'Experimental Plastics and Synthetic Resins', G. F. D'Alelio, J. Wiley and Sons, N. Y., 1946. Both unsubstituted and substituted phenols may be employed in the condensation. Especially useful for the purpose of the present invention are condensates derived from halo-substituted phenols. Further reaction of these condensates with lower aliphatic epoxides having from two to six carbon atoms, such as ethylene oxide or propylene oxide, according to well-known procedures extensively described in the art results in useful polyurethane polyols. (Examples of references to alkoxylation procedures are Smith, *J. Am. Chem. Soc.* 62, 994 (1940), and U. S. Pat. No. 1,730,061). Likewise oxyalkylated methylenebis(aniline) and its homologues available by oxyalkylation of the condensation products of formaldehyde and aromatic amines, such as aniline, are also of value for use in the present invention. Oxyalkylation products of mixtures of condensation products of phenols and aromatic amines may also be employed. Preferred novolaks will generally have one RING radical per hydroxyl radical and will have functionalities of from three to five, hydroxyl numbers ranging from 300 to 360, and more preferably from 300 to 340, and equivalent weights varying from 155 to 190. Halogenated novolaks will have equivalent weights ranging up to about 250.

Mannich radical-containing polyol constituents suitable for admixture with the above-described RING-containing polyols will have functionalities ranging from three to seven, and more preferably from three to five, with the most preferred ones having a functionality of three. The number of Mannich radicals will range from one to 3.5, and more preferably from 2.5 to 3.5 per kilogram of Mannich radical-containing polyol constituent, with the nitrogen content ranging from at least three to generally not more than six per cent by weight, and preferably being about five per cent by weight of this polyol constituent. Such polyol constituents will be further characterized by having molar molecular weights ranging from about 300 to 1000, and by equivalent weights ranging from about 100 to 150, and more preferably from 100 to 125.

Useful polyol constituents of this type are conveniently prepared by the addition of lower aliphatic epoxides to the Mannich condensation products of formaldehyde, a phenolic compound and a nitrogen-containing compound selected from the group consisting of lower aliphatic monoalkanolamines and lower aliphatic dialkanolamines. Suitable Mannich condensation products are prepared by coreacting one mole of phenol with from one to three, and more preferably from one to two moles of formaldehyde, and from one to three, and more preferably from one to two moles of alkanolamine. The most preferred compositions are those in which 1.0 to 1.2 moles of alkanolamine and 1.0 to 1.2 moles of formaldehyde are employed per mole of phenolic compound. These reactants are coreacted as described hereinabove, care being taken to avoid decomposition and side-reactions.

Useful alkanolamines and phenolic compounds are those listed hereinabove. Preferred for use are the lower aliphatic mono- and dialkanolamines, such as, for example, monoethanolamine, diethanolamine, monoisopropanolamine, diisopropanolamine, 2-amino-1-butanol, and hydroxyethylpiperazine. Preferred phenolic compounds are phenol, monohalosubstituted phenols, such as for example monochlorophenol or monobromophenol, dihalosubstituted phenols, such as dichlorophenol or dibromophenol, and alkylphenols with alkyl substituents having from one to 10 carbon atoms, such as for example, cresol, xylenol, p-tert-butylphenol, and nonylphenol. Especially preferred for use are phenol, monochlorophenol, and monobromophenol.

In order to obtain the Mannich radical-containing polyol constituents preferred for admixture in accord with the present invention the Mannich condensates are further reacted with lower aliphatic epoxides of from two to eight carbon atoms. Examples of useful epoxides are ethylene oxide, propylene oxide, 1,2-butylene oxide, glycidol, and styrene oxide.

The preparation of alkylene oxide adducts of compounds with active hydrogens is well known in the art. Useful descriptions can be found, for example, in Chapters III and IV of "Polyethers" Part I, edited by N. G. Gaylord and published by Interscience, 1963, New York, and in "Glycols" pp. 94-102 and 252, edited by G. O. Curme Jr. and published by Reinhold Publishing Co., 1952, New York. U. S. Pat. No. 3,297,597 is another reference dealing specifically with the addition of alkylene oxides to Mannich condensates. The addition of the epoxide to the Mannich condensate is conducted within a temperature range of about 50° to 150° C., and more preferably of about 75° to 125° C. Since the Mannich condensate is capable of catalyzing the alkoxylation reaction no external catalyst is usually required, although added catalysts may be used if desired. The amount of alkylene oxide used will equal at least one mole per mole of active hydrogen present in the Mannich condensate, said active hydrogen being composed of phenolic hydrogen atoms and secondary amino hydrogen atoms, if present. The amount of epoxide employed will generally range from one mole per mole of Mannich condensate to usually not more than ten moles, with the preferred ratio of epoxide to Mannich condensate ranging from about 1.2 to 4.0.

The preferred polyurethanes of the present invention are prepared by mixing and coreacting the polyols or polyol blends described hereinabove with organic polyisocyanates having an average isocyanato group functionality of at least two, and more preferably greater than two. For the preparation of rigid foams the polyol component and the polyisocyanate are mixed and reacted in the presence of a blowing agent in accordance with standard techniques well known in the art. For example, references which disclose the preparation of polyurethane foams are U. S. Pat. Nos. 2,779,689; 2,785,739; 2,787,601; 2,788,335; 3,079,350; and the bulletin "Rigid Urethane Foams, II, Chemistry and Formulation" by C. M. Barringer, RR-26, Elastomer Chemicals Department, E. I. du Pont Co., April, 1958, and the books by J. H. Saunders and K. C. Frisch "Polyurethanes, Chemistry and Technology," Volumes I and II, Interscience, N. Y., 1962 and 1964. In the preparation of rigid roams it is possible to use the so-called "one-shot" method in which all ingredients of the formulation are combined in one step, or one may employ the prepolymer technique wherein the polyisocyanate is partially prereacted with the polyol. In preparing the instant polyurethanes the one-shot method is preferred. If polyols consisting of a physical admixture of two polyols, one of which has RING radicals incorporated into the polymer chain and the other a Mannich radical are employed, a prepolymer technique may be used by advisably prereacting the RING-radical containing polyol with the polyisocyanate.

Any suitable organic polyisocyanate may be used, such as for example aliphatic, aromatic and heterocyclic polyisocyanates. Especially preferred for use are aromatic polyisocyanates with an average isocyanato group functionality of at least 2.3, and more preferably of at least 2.5. It has been found that the fire resistance of the resulting polyurethanes as measured by flame penetration increases with increasing isocyanato group functionality of the polyisocyanate employed. Representative of the polyisocyanates which can be employed are such compounds as 2,4-tolylene diisocyanate, 2,6-tolylene diisocyanate, crude tolylene diisocyanates, 1,4-phenylene diisocyanate, 1,3-phenylene diisocyanate, 1,5-naphthalene diisocyanate, 4,4'-diphenylene diisocyanate, 3,3'-dimethyl-4,4'-diphenylene diisocyanate, 4,4'-diisocyanato diphenylmethane, and 4,4',4''-triisocyanato triphenylmethane, tri-(p-isocyanatophenyl)phosphoric acid triester, tri-(p-isocyanatophenyl)thiophosphoric acid triester and furfurylidene diisocyanate. Especially preferred polyisocyanates are polymethylene polyphenylisocyanates produced by the phosgenation of multifunctional condensation products of aniline and formaldehyde. These polyisocyanates are generally mixtures of para- and ortho-substituted derivatives of varying molecular weights and are well known in the polyurethane art. One such product sold under the tradename PAPI is a dark, somewhat viscous liquid aromatic polyisocyanate containing both ortho and para substitution according to the formula:

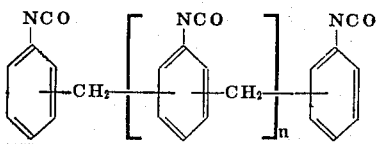

where $n$ has an average value of about 1. The molecular weight is about 384 and the average number of isocyanato groups per molecule is 3.03. A similar product is known in the trade as Mondur MR. Also very useful are aromatic polyisocyanates containing halogen. Examples of such materials are chloro- and bromo- derivatives of phenylene diisocyanate and tolylene diisocyanate. Polyisocyanates made by reacting trimethylolpropane or similar polyols with tolylene diisocyanates may also be used. Mixtures of polyisocyanates may advantageously be used.

The two principal components of the formulation, polyisocyanate and polyol, are employed in proportions customary in the art. Thus the ratio of isocyanato groups to hydroxyl groups is at least 1.00 and can be as high as about 1.12. Preferred ratios are found in the range of NCO/OH ratios of 1.05 to 1.10.

Blowing agents may be chosen from a variety of known blowing agents for urethane foams. The preferred blowing agents for the preparation of the polyurethane foams of the present invention are the low-boiling halocarbons. A very preferred blowing agent, for example, is trichloromonofluoromethane. Examples of other useful blowing agents are dichlorodifluoromethane, monochlorotrifluoromethane, methylene chloride, 1,1-difluoroethane, 1,1-difluoro-1,2,2-trichloroethane, and trichlorotrifluoroethane. Other blowing agents, known to the art, such as butane may also be employed. Mixtures of blowing agents are useful.

Depending on the polyurethane formulation, the polyol/polyisocyanate/blowing agent reaction mixture will also desirably contain other conventional ingredients generally employed in the art for various reasons, such as to improve the mixing of the components, to influence the cellular structure of the foamed polymer, to increase the rate of the cross-linking reaction, to improve the light stability, etc. Conventional additives which may be optionally used generally comprise one or more catalysts, surfactants, nucleating agents, emulsifiers, fillers, stabilizing agents and the like.

Many other additives employed in the art to confer or enhance flame-resistance may also advantageously be additionally incorporated into the polyurethane compositions of the present invention. Representative useful additives are antimony oxide, aluminum powder, graphite, oven-dried corn starch and kieselguhr. Antimony oxide is especially preferred as an additive which will increase the flame retardancy of the instant compositions even further. Although the art reports the use of phosphorus-containing compounds as additives to increase flame retardancy, such compositions are advisably excluded from the compositions of the present invention which contain any substantial amount of halogen, since such additives seem to impair the excellent properties of such instant compositions. Such other components are employed in the standard amounts generally used in the preparation of polyurethane, with the exception that little or no extraneous catalyst may be required since the polyol components employed in the present invention possess sufficient inherent catalytic activity.

Although no additional catalyst is necessary, any of the conventional catalysts employed in polyurethane technology can be used as warranted. Some examples of useful catalysts which can be employed are tertiary amines, such as tetramethyl-1,3-butanediamine, triethylenediamine, triethanolamine, diethylethanolamine, triethylamine, N-methylmorpholine, N-ethylmorpholine, 1-methyl-4-dimethylaminoethylpiperazine, N,N-dimethylbenzylamine and the like, as well as various tin compounds, such as dibutyltin dilaurate, stannous oleate, stannous octoate and others, metal salts such as ferric acetylacetonate, molybdenum glycolate and various organometallic compounds disclosed in the art.

Similarly any of the various types of surfactants and emulsifiers known in the art to be useful in the preparation of cellular polyurethanes may be employed in the process of preparing polyurethane foams according to this invention. Examples of suitable surfactants are castor oil sulfonate, ethylene oxide adducts of sorbitol monoesters of long-chain fatty acids, ethylene oxide adducts of alkyl phenols, polydimethylsiloxanes, and especially ethylene oxide adducts of polydimethylsiloxanes. These latter compounds, and sililar block copolymers of polyglycols and dimethylsiloxane are especially useful for this purpose. U. S. Pat. No. 2,834,748 describes such especially suitable water-soluble organo-silicone copolymers for use as emulsifying agents. Examples of useful commercially available siloxane-oxyalkylene block copolymers are DC–113, DC–193, X–520, and Silicone Fluid 199.

The present invention is especially valuable for the preparation of foams from halogen-containing polyols. The resultant foams exhibit a resistance to flame which is quite surprisingly markedly greater than that of foams prepared from polyols containing only one of the respective structural units and the instant foams will also exhibit equal or better dimensional stability when subjected to humidity at elevated temperatures.

The art recognizes several degrees of resistance to flame and various test procedures are in use. The lowest degree of protection is characterized as self-extinguishing according to ASTM test D–1692. In this test a small bar specimen of the foam is ignited, and the flame has to extinguish itself before reaching the 5 inch mark on the foam in order to merit the rating self-extinguishing. A greater measure of protection is afforded by the term non-burning according to this test. In non-burning foams the flame extinguishes itself without travelling any appreciable horizontal distance. The compositions of the present invention frequently exhibit a much faster flame-out than the minimum required to qualify for the non-burning rating according to ASTM D–1692 test. The test which best illustrates the synergistic effect in flame retardancy observed in the compositions of the present invention is a flame-penetration time. The flame penetration time measures the length of time it takes an impinging flame to break through a foam panel and thus is a measure of the fire-barrier protection which a foam provides. The flame-penetration times of the instant compositions were measured by a modified Bureau of Mines flame-penetration test. The flame-penetration time periods measured for foams prepared from polyols containing the proper combination of Mannich radicals and halogenated RING radicals in accordance with the present invention are much larger than those found for foams derived from polyols containing only one of the respective radicals. Increases in flame-penetration time of one order of magnitude or greater are realizable with the preferred compositions of this invention.

In addition to the synergistic effect between the two structural units (X) and (Y) of the polyol component I have further discovered, quite unexpectedly, that the presence of small amounts of an aliphatic tertiary amino structure in the instant polyurethane foam formulations results in a further improvement in the dimensional stability of the final foam. The incorporation of such entirely aliphatic tertiary amino radicals into the instant polyurethane formulations has also a marked effect on the amount of halogenated RING radicals required to provide optimum flame retardancy and burn-through time. Specifically incorporation of such tertiary amino structures permit a reduction in the halogen content of the polyol without loss in flame retardancy. For example, the addition of about 0.5 gram mols of such aliphatic tertiary amino radicals reduces the amount of halogenated RING radicals required for optimum flame retardancy by about twenty percent. Such entirely aliphatic tertiary amino radicals have to be present in addition to the tertiary aralkyl aliphatic nitrogen atoms present in the form of the Mannich condensation product. The fully aliphatic and the aralkyl aliphatic nitrogen atoms appear to be non-equivalent and do not seem to have the same effect in the foam.

The aliphatic tertiary amino radicals which can give rise to this additional synergistic effect may be present in a compound which is physically admixed with the polyurethane formulation, or these radicals may advantageously be chemically incorporated into the RING-containing polyol component. If the aliphatic tertiary amino radicals are added in the form of an additional physically admixed component it is usually found that for the optimum flame retardancy formulation the polyol component containing the halogenated RING radicals is reduced by an amount approximately equal to the amount of tertiary aliphatic amino component added, and that the amount of Mannich radical containing component remains unchanged or may even be slightly increased over the binary polyol mixture.

Suitable polyurethane formulations prepared according to this embodiment will usually contain aliphatic tertiary amino nitrogen in amounts ranging from about 0.1 percent by weight to generally not more than five per cent by weight, based on the weight of the polyol component. Preferred formulations will contain aliphatic tertiary amino nitrogen atoms in amounts ranging up to 2.0 gram atoms of aliphatic tertiary amino nitrogen per kilogram of polyol component, and more frequently up to about 1.5 gram atoms of aliphatic tertiary amino nitrogen per kilogram of polyol component. Although there appears to be no lower limit to the amount of such aliphatic tertiary amino nitrogens which may be employed, for many formulations a range of about 0.25 to about 1.0 gram atoms of aliphatic tertiary amino nitrogen per kilogram of polyol component is frequently preferred.

In order to be useful in the present application the aliphatic tertiary amino nitrogen structures should not exert an undesirably large catalytic effect since this results in uncontrollably fast reaction rates and premature gelation, and they should advisably not be present in the formulation as part of an inert additive, since this results in a plasticizing action and gives rise to a soft foam. Thus the aliphatic tertiary amino nitrogen radicals are preferably incorporated into the formulation in the form of a reactant which exerts only a moderate catalytic effect on the hydroxyl radical-isocyanate reaction. Especially preferred for use are aliphatic alkanolamines or polyols incorporating aliphatic alkanolamine residues, such as oxyalkylated polyamines, and alkanolamine-initiated hydroxyl-terminated polyester-ether copolymers.

Representative of the preferred aliphatic tertiary amino radical-containing compounds are trialkanolamines, such as for example triethanolamine, tripropanolamine, triisopropanolamine, and hydroxyalkylated polyamines, such as tetrakishydroxypropyl ethylene-diamine, bishydroxyethyl piperazine or pentakishydroxypropyl di-ethylene triamine. Any of the aliphatic hydroxyalkylamines having from two to six hydroxyl radicals and from one to four tertiary amino nitrogen atoms appear to be useful. The aliphatic tertiary amine structural unit may also conveniently be present incorporated into a RING-containing polyester-ether as a residue of an alkanolamine starter. Thus polyester-ether polyols prepared by coreacting alkanolamines, cyclic monoanhydrides of the structural formula

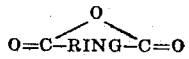

and cyclic monoethers selected from the group consisting of monoepoxides and monooxetanes may advantageously be employed in the instant polyurethane formulations in combination with Mannich radical-containing polyols. The preparation of suitable alkanolamine-initiated hydroxyl-terminated polyester-ether copolymers is described in detail in U. S. Pat. No. 3,454,530.

The instant invention is also useful for the preparation of polyurethane castings. In the formation of such castings the polyol and polyisocyanate are combined and, without a catalyst, can be cured at about 70° to 150° C. to a solid product. The increased reactivity of the instant polyols which appears to stem from their tertiary nitrogen content is particularly advantageous in the application. When a catalyst such as a tertiary amine or a tin compound is used, curing can be achieved at room temperature.

The polyurethane compositions of the instant invention also serve as tough, hard adherent coatings in a number of applications. Any suitable substrate may be coated such as, for example, wood, metal, fiber, paper and the like. Specifically, these polyurethanes form excellent protective coatings for wood surfaces subjected to abrasion and impact, such as floors, furniture, and bowling alleys. They also form excellent protective coatings for metal substrates subjected to bending, abrasion, or chemical attack. The polyurethane coating compositions can be applied to such surfaces by any of the conventional fluid-coating techniques such as, for example, spray, dip, brush, knife and roller coating. The compositions may be diluted with solvents such as lactones, ketones, esters, ethers, and others, and pigments and other additives may be added, if desired. In general, the solvent-diluted compositions are coated onto the substrate, then dried and cured at room temperature or elevated temperature. The cured coating compositions are hard, flame-resistant, flexible, abrasion-resistant and chemically inert and exhibit excellent adhesion.

The following specific examples are present for the purpose of illustrating the practice of this invention and they are not intended to limit the scope of the invention.

EXAMPLE I

A. A Mannich condensation product was prepared by combining 93.8 grams of phenol (USP grade) and 104.5 grams of diethanolamine in a 500 ml. flask, with rapid stirring to effect solution. An exothermic reaction ensued. After cooling the reaction mixture to room temperature, 74.5 grams of a 40 percent aqueous solution of formaldehyde were added slowly with cooling to maintain the flask at about room temperature. Upon completion of addition, the reaction mixture was allowed to stand for forty hours at room temperature. The reaction mixture was then slowly heated to 85° C. and maintained at that temperature for four hours. At the end of this period, the reaction mixture was vacuum stripped under a water-pump vacuum while heating to a temperature of 126° C. in the flask. The product which weighed 208.9 grams was a straw-colored, viscous fluid. Its theoretical equivalent weight was calculated to be 70.

B. 76.9 grams of the above Mannich condensation product, 67.0 grams of Chlorendic anhydride and 98 grams of propylene oxide were placed into a one-liter 316 stainless steel pressure vessel equipped with stirrer. The vessel was sealed and the contents heated to 70° C. with stirring. The reaction mixture was maintained within a temperature range of about 70° to 95° C. for a period of 1 hour and 45 minutes. The vessel was then vented of all volatiles and the product recovered. The product, a pale yellow fluid with a viscosity of about 100,000 centipoises, weighed 196.7 grams and had a theoretical equivalent weight of 179.

C. A foam was prepared by mixing 53.2 grams of the chlorine-containing polyol of Part B, 0.6 grams of a 20 percent solution of triethylene diamine in dimethylethanolamine, 0.8 grams of a block copolymer of dimethylsiloxane and polyethylene oxide, and 10.3 grams of fluorotrichloromethane. Then 42.9 grams of polymethylene polyphenyl isocyanate were stirred in. The resultant foam had a rise and tack-free time of about 2 minutes. The resultant foam was self-extinguishing when tested according to the ASTM 1692 procedure, and showed less than 10 percent volume expansion when subjected to 70° C. and 95 percent relative humidity for one week.

Similar results were obtained when 81.0 grams of Mannich condensate were coreacted with 58.6 grams of tetrachlorophthalic anhydride and 102 grams of propylene oxide in Step B and a foam was prepared from this polyol.

EXAMPLE II

A. 127.7 grams of a Mannich condensation product prepared as described in Example I, Part A, and 97 grams of propylene oxide were placed in a stirred, 316 stainless steel, one-liter pressure vessel. The vessel was sealed and heated to 60° C., from which point an exotherm carried the temperature to 80° C. The vessel was then allowed to cool slowly to room temperature. The reaction mixture was then reheated to a temperature range of 90° to 100° C. and maintained within this temperature range for 32 minutes. The vessel was then vented to remove any volatiles including unreacted epoxide, and the polymeric product was recovered. The product weighed 200.8 grams. It was a pale yellow fluid with a viscosity of 32,000 centipoises at 26° C. The theoretical equivalent weight of the propylene oxide adduct was calculated to be 110.

B. The above experiment was repeated except that the temperature was maintained within a temperature range of 90° to 100° C. for only 18 minutes. After venting the vessel 193.2 grams of a pale yellow fluid having a viscosity of 15,000 centipoises at 25° C. was recovered. The equivalent weight of the propoxylated Mannich condensate was 105.5.

C. A lower-equivalent-weight Mannich condensation product was prepared by the reaction of phenol, monoisopropanolamine, and paraformaldehyde, followed by reaction with propylene oxide. In a 100 ml. flask was placed a magnetic stirring bar, 23.3 grams of phenol, 18.2 grams of monoisopropanolamine, and the mixture stirred to solution. Then 8.0 grams of 95 percent paraformaldehyde was added. A mold exothermic reaction took place. After standing overnight the flask was heated under reflux for 1 hour, and then volatiles were stripped off under a water-pump vacuum and a temperature of 105° C. The resulting product weighed 45.0 grams, was clear orange in color, and had a viscosity of about 100,000 centipoises at 25° C.

This product was transferred to a 250 ml. stainless steel, heated, magnetically agitated pressure vessel. 50 grams of propylene oxide were added, the vessel was sealed, and then heated to about 80° C., and this temperature was maintained for 3¼ hours. The excess epoxide was vented. The product was pale orange in color, weighed 75.2 grams, had an equivalent weight of 101, and a viscosity of about 20,000 centipoises at 25° C.

EXAMPLE III

A. 510.2 grams of the Mannich condensate-propylene oxide adduct of equivalent weight 105.5, prepared as in Example IIB, 301.4 grams of tetrabromophthalic anhydride, and 115 grams of propylene oxide were placed into a one-liter, 316 stainless steel pressure vessel equipped with stirrer. The vessel was heated to 70° C. from which point an exothermic reaction carried the temperature to 95° C. The temperature was then maintained within a range of 90° C. to 120° C. for a period of 1 hour and 44 minutes. The vessel was then vented to remove excess propylene oxide, and the product was recovered. The polymeric product was pale amber in color, weighed 866 grams and had a bromine content of 29 percent by weight and a theoretical equivalent weight of 178. The viscosity measured at 26° C. was 7.1 million centipoises.

B. A foam was prepared by mixing 25.9 grams of the above bromine-containing polyol, 18,85 grams of propoxylated pentaerythritol of 100 equivalent weight, 0.85 grams of a 20 percent solution of triethylenediamine in dimethylethanolamine, 1.7 grams of polyethylene glycoldimethylsiloxane block copolymer (L 5340), and 13.6 grams of stabilized fluorotrichloromethane. Then 49.0 grams of methylene polyphenylisocyanate (Mondur MR) was rapidly stirred in. The mixture had a cream time of 20 seconds, a tack-free time of 105 seconds, and a rise time of 130 seconds. The foam was self-extinguishing when tested by the ASTM-1692 test procedure and the time to flame out was 10-15 seconds after removal of the flame. The flame penetration time was 9.2 seconds/inch. The foam had a core density of 2.21 pounds per cubic foot. When cut samples of the foam were aged for 1 week at 73° C. in a closed oven containing 3 open pans of water, the average volume change for 2 samples was 0.8 percent.

C. In order to illustrate the improved dimensional stability of the polyurethane foams of the present invention, foams were made from three other similar bromine-containing polyols for comparison with the above foam.

1. The polyol used for this foam was prepared by coreacting 8 pounds of glycerol, 30 pounds of tetrabromophthalic anhydride, and 16 pounds of propylene oxide. The equivalent weight of the polyol was 205, and the bromine content 37 per cent by weight. A foam was prepared by mixing 25.4 grams of this polyol, 18.4 grams of propoxylated pentaerythritol of equivalent weight 100, 0.9 grams of a 20 percent solution of triethylene diamine in dimethylethanolamine, 1.2 grams of a polyethylene glycol-polydimethylsiloxane (L-5340) and 14.7 grams of stabilized fluorotrichloromethane. Then 60.3 grams of polymethylene polyphenylisocyanate were rapidly mixed in. The cream time was 18 seconds, the tack-free time was 115 seconds, and the rise time was 135 seconds. The foam was self extinguishing when tested by ASTM 1692, and the flame-out time after removal of the flame was about 10 seconds. This foam had a core density of 2.09 pounds per cubic foot. When cut samples of the foam were aged for 1 week at 73° C. in a closed oven containing 3 open pans of water, the average volume change for 2 samples was 6.7 percent.

2. The polyol used for this foam was prepared by reacting 40.7 grams of diethanolamine, 61.5 grams of 95 percent glycerol, 432.4 grams of tetrabromophthalic anhydride, and 96 grams of propylene oxide. The equivalent weight of the polyol was 199, and the bromine content was 47.5 percent by weight. A foam was prepared by mixing 27.1 grams of this polyol, 21.8 grams of propoxylated pentaerythritol of equivalent weight 100, 0.7 grams of a 20 percent solution of triethylene diamine in dimethylethanolamine, 1.4 grams of polyethylene glycol-polydimethylsiloxane block copolymer(L 5340) and 16.3 grams of stabilized fluorotrichloromethane. Then 52.0 grams of polymethylene polyphenylisocyanate were rapidly mixed in. The cream time was about 20 seconds, and the rise and tack-free time was 120 seconds. The foam was just non-burning when tested by ASTM-1692. The core density was 2.04 pounds per cubic foot. When cut samples of the foam were aged for 1 week at 73° C. in a closed oven containing 3 open pans of water, the average volume change for 2 samples was 3.2 percent.

3. The polyol used for this foam was prepared by reacting 25.0 grams of diethanolamine, 56.8 grams of triethanolamine, 210.2 grams of tetrabromophthalic anhydride, and 73 grams of propylene oxide. The equivalent weight of the polyol was 196, the bromine content was 39.7 percent by weight, and the viscosity was 105,000 centipoises at 30° C. A foam was prepared by mixing 23.5 grams of the above polyol, 17.8 grams of propoxylated pentaerythritol of equivalent weight 100, 0.75 grams of a 20 percent solution of triethylene diamine in dimethyl ethanolamine, 1.15 grams of a block copolymer of polyethylene glycol and polydimethylsiloxane, and 12.2 grams of stabilized fluorotrichloromethane. The 44.0 grams of polymethylene polyphenylisocyanate (Mondur MR) were rapidly stirred in. The cream time was 15 seconds, the tack-free time 60-65 seconds, and the rise time was 85 seconds. The foam was non-burning when tested by ASTM-1692, and the flame-out time was 5 seconds after removal of the flame. The core density of the foam was 1.97 pounds per cubic foot. When cut samples of the foam were aged for 1 week at 73° C. in a closed oven containing 3 open pans of water, the average volume change for 2 samples was 3.3 percent.

EXAMPLE IV

The Mannich condensate of phenol, diethanolamine, and formaldehyde was prepared and hydroxypropylated as in Example IIB The equivalent weight per hydroxyl group was 105. Into a 1-liter, 316 stainless steel pressure vessel, fitted with stirrer and heater, was placed 74.8 grams of this Mannich product, 42.6 grams of trimethylolpropane, 140.7 grams of tetrabromophthalic anhydride, and 141 grams of propylene oxide. The vessel was sealed and heated to about 50° C., from which point an exotherm carried the temperature to about 70° C. The temperature was maintained at about 65°-75° C. for 3 hours and 45 minutes, and then the excess epoxide was vented and the product recovered. The product weighed 291 grams, had a bromine content of 33.3 percent by weight, and a hydroxyl equivalent weight of 175. The product was pale yellow in color. The viscosity of the product was about 10-20 million centipoises at 25° C.

A foam was prepared from the above polyol using the proportions and procedure of Example IIIB. This foam was very similar to that of Example IIIB in properties.

EXAMPLE V

Into a 300 ml. flask was placed a magnetic stirring bar, 71.0 grams of purified β-naphthol, and 35.8 grams of monoisopropanolamine. The mixture was warmed, stirred until a solution was formed, and then cooled. Then 16.0 grams of 95 percent paraformaldehyde was added slowly with intermittent cooling of the exothermic reaction. On standing at room temperature for a few hours the mixture became quite viscous. After standing overnight, the mixture was refluxed for 1 hour to insure completion of the reaction, and was then stripped under a water-pump vacuum at 85° C. The product weighed 118.0 grams and had a viscosity of several hundred thousand centipoises at room temperature.

This product was placed in a 1-liter, 316 stainless steel pressure vessel along with 74 grams of propylene oxide. The vessel was then sealed and heated to 70° C. and then maintained at this temperature for 1 hour. At the end of this time there was little pressure present, so the excess epoxide was vented, and the product recovered. The product weighed 186 grams, and had an equivalent weight of 128.

This product was replaced in the 1-liter pressure vessel, and 45.3 grams of phthalic anhydride and 103 grams of propylene oxide added. The vessel was sealed, heated to 100° C. and maintained at this temperature for 4½ hours. The excess propylene oxide was then vented and the product recovered. The recovered product had a viscosity of several million centipoises at room temperature, weighed 252 grams and had a hydroxyl equivalent weight of 174.

This final product was heated and mixed with 50 grams of fluorotrichloromethane under pressure in the pressure vessel to make a fluid solution. The pressure vessel was then allowed to cool and the solution recovered. A foam was prepared by mixing 72.3 grams of this solution with 1.1 grams of a block copolymer of dimethylsilicone and polyethylene oxide (SF-1109), and 0.3 grams of N,N,N',N'-tetramethyl-1,3-butanediamine. Then 49.9 grams of polymethylene polyphenyl isocyanate were stirred in. The resulting foam had a density of about 2.0 pounds per cubic foot and was self-extinguishing when tested according to the procedure of ASTM-1692. This foam had a volume expansion of less then 10 percent when exposed to 70° C. and 95 percent relative humidity for a period of 1 week.

EXAMPLE VI

A high-bromine content Mannich condensation product was prepared by reacting p-bromophenol, monoisopropanolamine, and paraformaldehyde. Into a 500 ml. flask was placed a magnetic stirring bar, 174.7 grams of p-bromophenol and 60.1 grams of monoisopropanolamine. The mixture was warmed, stirred to solution, and then cooled. Then 42.0 grams of 95 percent paraformaldehyde was added. A mold exothermic reaction took place during the latter addition. After standing a short time, 26.7 grams of water were added and the heterogeneous mixture slowly heated to reflux and then refluxed for 1½ hours. On standing, the lower layer solidified. Then the upper aqueous layer was decanted, and the lower layer was heated under water-pump vacuum to 112° C. The weight of the product was 250.3 grams.

250.0 grams of the product and 140 grams of propylene oxide were placed in a 1-liter stainless steel pressure vessel and heated at about 90° C. for 8 hours, and 100°–110° C. for 3½ hours. The excess epoxide was then vented and the product recovered. The product weighed 358 grams, had an equivalent weight of 143, a bromine content of 22.5 percent by weight, and was straw-colored. This product had a viscosity of a few million centipoises at room temperature.

Into a 1-liter 316 stainless steel pressure vessel was placed 321.1 grams of the above product, 154.9 grams of tetrabromophthalic anhydride, and 228 grams of propylene oxide. The vessel was sealed and heated to 70° C., then stirring was started. The temperature was then raised to 90°–95° C. and held in this range for 2¾ hours. Then the excess epoxide was vented and the product recovered. The product was solid at room temperature, weighed 502 grams, had an equivalent weight of 224, and a bromine content of 35.7 percent by weight.

A foam was prepared in a fashion similar to that used in Example IIIB, except that 32.5 grams of the above polyol was used in place of the polyol of Example IIIA. The resultant foam was somewhat improved in flame retardancy and dimensional stability.

EXAMPLE VII

In a 500 ml. flask was placed 329.0 grams of p-bromophenol and 71.1 grams of monoisopropanolamine. The mixture was heated to solution and cooled to 30° C. Then 141.4 grams of 40 percent formaldehyde solution was slowly added, with cooling to maintain the temperature at about 30°–35° C. The mixture was allowed to stand overnight, and then refluxed for 3½ hours. The product was cooled and the upper layer was decanted. Then 3.7 grams of paraformaldehyde and 42.0 grams of water were added, and the mixture refluxed for 1 hour. The product was again cooled, and the upper layer again decanted. The lower layer was then heated to about 110° C. under a water-pump vacuum. The extremely viscous product weighed 423.7 grams, and had a theoretical equivalent weight of 148.5. The bromine content was 35.9 percent by weight.

Into a stirred, heated, 1-liter 316 stainless steel pressure vessel was placed 43.2 grams of the above polymer, 80.3 grams of 99.5 percent glycerol, 304.1 grams of tetrabromophthalic anhydride, and 292 grams of propylene oxide. The vessel was sealed, heated to 110° C. and maintained in the temperature range of 110°–130° C. for 3½ hours. The vessel was then vented, and the product recovered. The product weighed 586 grams, was amber in color, and had a viscosity of about 2 million centipoises at 25° C. The theoretical equivalent weight was 201 and the bromine content was 38.4 percent by weight.

A mixture was prepared of 20.2 grams of hydroxypropylated pentaerythritol (of 100 equivalent weight), 29.3 grams of the above polyol, 0.8 grams of a 20 percent solution of triethylene diamine in dimethylaminoethanol, 0.7 grams of dimethylsiloxane-polyethylene glycol block copolymer surfactant, and 15.1 grams of fluorotrichloromethane. Then 48.9 grams of polymethylene polyphenylisocyanate were rapidly stirred in. The mixture foamed, and had a rise time of about 130 seconds. The resultant foam had a core density of 1.9 pounds per cubic foot, was non-burning when tested according to ASTM 1692, and showed a dimensional stability about like that of Example IIIB.

EXAMPLE VIII

A. 503 grams of a Mannich condensate-propylene oxide adduct of equivalent weight 105.5, prepared as in Example IIB, 149.0 grams of phthalic anhydride, and 115 grams of 1,2-butylene oxide were placed into the 1-liter, stirred, 316 stainless steel pressure vessel. The vessel was sealed and heated to 100° C., and then held at 100°–110° C. for a period of 2½ hours. The vessel was then vented and the product recovered. The product weighed 726 grams, was pale straw in color, and had a theoretical equivalent weight of 152. B. A foam was prepared from the above polyol by mixing 50.8 grams of the above polyol, 0.7 grams of a 20 percent solution of triethylene diamine in dimethylaminoethanol, 0.8 grams of a block copolymer of dimethylsiloxane and polyoxyethylene, and 13.1 grams of fluorotrichloromethane. Then 47.9 grams of polymethylene polyphenyl isocyanate were rapidly stirred in. The resultant foam had a rise and tack-free time of about 2 minutes. This foam showed excellent dimensional stability.

Another polyol was prepared by repeating step A except that 105 grams of ethylene oxide was used in place of the butylene oxide. The product weighed 718 grams and had a theoretical equivalent weight of 150. It was noticeably less viscous than the polyol made with butylene oxide. A foam prepared from this polyol, with the same proportions of reactants as in Step B, was very similar.

Step A was again repeated using the Mannich condensate of Example IIC instead of IIB, and tetrahydrophthalic anhydride in place of phthalic anhydride, with the proportions and procedure being otherwise about the same as in Step A. This polyol was used to prepare a foam which exhibited about the same properties as that prepared in B.

EXAMPLE IX

A foam was prepared by mixing 35.9 grams of the bromine-containing, 205 equivalent-weight triol of Example IIIC-1, 27.0 grams of the 105.5 equivalent-weight propoxylated Mannich condensation product of Example IIB, 9.2 grams of finely powdered pigment-grade antimony trioxide, 0.5 grams of the 20 percent solution of triethylene diamine in dimethylaminoethanol, 0.6 grams of polyoxyethylene-dimethylsiloxane block copolymer (DC 193), and 15.9 grams of fluorotrichloromethane. Then 63.2 grams of polymethylene polyphenyl isocyanate were rapidly stirred in. The mixture creamed in about 10 seconds, had a tack-free time of 50 seconds and a rise time of 60 seconds. The foam had extremely fine regular cells and a core density of 2.02 pounds per cubic foot. This foam approximated a 25-flame spread rating in the ASTM E-84 tunnel test. When aged at 70° C. and 100 percent relative humidity, this foam had a volume expansion of 4.5 percent in 12 days, and remained essentially at constant volume after that time.

EXAMPLE X

All of the foams of this example were prepared by mixing the polyol or polyol blends identified in Table I, a catalyst, where used, a dimethylsiloxane-polyethylene glycol block copolymer surfactant designated SF 1109 and the fluorotrichloromethane blowing agent, and then rapidly stirring in the polymethylene polyphenyl isocyanate designated PAPI. Table I lists the proportions of reactants used in the formulation in parts by weight and the resultant foam properties.

As given in the Table I,

Polyol A was a trifunctional Mannich condensate-propylene oxide adduct of equivalent weight 105.5, prepared as in Example IIB.

Polyol B was a hydroxypropylated phenol-formaldehyde novolac resin having a functionality of about three and an equivalent weight of 166.

Polyol C was a bromine-containing triol of equivalent weight 178, prepared as in Example IIIA.

Polyol D was an oxypropylated pentaerythritol polyether of equivalent weight 100.

Polyol E had an equivalent weight of 117 and was prepared by coreacting in a sealed pressure vessel, with stirring, 169.8 grams of 99.5 percent glycerol, 25.2 grams of the crystalline adduct of maleic anhydride and cyclopentadiene (Nadic anhydride), and 375 grams of propylene oxide for a period of 330 minutes at a temperature of 120° to 140° C., venting any volatile components and isolating the polyol.

Polyol F was a bromine-containing triol of equivalent weight 205, prepared as in Example IIIC-1.

Polyol G was an oxypropylated methylglucoside polyether of equivalent weight 114.

Polyol H had an equivalent weight of 139 and a chlorine content of 22% by weight and was prepared by coreacting in a sealed pressure vessel, with stirring, 194.4 grams of trimethylolethane, 302.4 grams of the crystalline adduct of tetrahydrophthalic anhydride and hexachlorocyclopentadiene, and 158 grams of propylene oxide, for a period of 5 hours at a temperature of 160° to 170° C., venting any unreacted epoxide, and recovering the polyol.

Polyol I was O,O-diethyl-N,N-bis(hydroxyethyl)aminomethyl phosphonate.

Catalyst $a$ was dibutyltin dilaurate.

Catalyst $b$ was a 20 percent solution of triethylene diamine in dimethylethanolamine.

The resultant foams were aged at least three days at room temperature before samples were cut from the core for evaluation.

The flame penetration time (FPT) was measured by a modified Bureau of Mines flame penetration test. The flame used was a propane-air flame from a 9/16 inch diameter hand-type propane gas torch. The flame was adjusted to give a 1-inch-long inner cone, and the tip of the inner cone was held 1 inch from the foam surface. The foam specimen used was a nominal one-inch thick, held vertically. The flame was positioned horizontally, normal to the foam surface. The flame penetration time was calculated in seconds per inch of actual thickness of the foam specimen.

The volume expansion on humid aging was determined after maintaining the foam samples for 2 weeks at 67° C. in a sealed 1-gallon container having a layer of water on the bottom.

TABLE I

| Foam Number | 1 | 2 | 3 | 4 | 5 | 6 | 7 | 8 | 9 | 10 | 11 | 12 |
|---|---|---|---|---|---|---|---|---|---|---|---|---|
| Polyol: | | | | | | | | | | | | |
| A | 44.5 | 46.4 | 49.6 | 39.2 | | 32.4 | | 34.8 | 30.9 | 42.3 | 24.9 | 27.8 |
| B | | | | 14.2 | | | | | | | | |
| C | | | | | 25.9 | | | | | | | |
| D | | | | | 18.85 | | | | | 17.0 | | |
| E | | | | | | 20.0 | | | | | | |
| F | | | | | | | 50.9 | | | | 37.3 | |
| G | | | | | | | | | 13.6 | | | |
| H | | | | | | | | | | | | 52.8 |
| I | | | | | | | | | | 5.3 | | |
| Surfactant | 0.7 | 0.75 | 0.55 | 0.5 | 1.7 | 0.6 | 0.6 | 0.6 | 0.6 | 0.6 | 1.1 | 1.1 |
| CFCl₃ | 19.2 | 23.7 | 20.8 | 20.8 | 13.6 | 19.1 | 15.0 | 20.1 | 20.2 | 20.3 | 16.5 | 25.4 |
| Polyisocyanate | 63.0 | 66.2 | 68.5 | 67.5 | 49.0 | 69.1 | 30.3 | 65.7 | 67.0 | 64.7 | 61.6 | 93.1 |
| Catalyst a | | | 0.1 | 0.08 | | | | | | | | |
| Catalyst b | | | | | | 0.85 | | 1.0 | | | 0.4 | 0.4 |
| Foam density (pounds/cu. ft.) | 1.96 | 1.62 | 1.88 | 1.96 | 2.15 | 1.99 | 1.91 | 1.98 | 1.87 | 1.78 | 2.08 | 2.22 |
| FPT (sec./inch) | 8 | | 14 | 9 | 21 | 6 | | | | | 146 | 141 |
| Volume expansion (percent) | 6.9 | 8.8 | 6.6 | 5.5 | 3.9 | 6.8 | 10.2 | 10.0 | 10.8 | 10.8 | 4.7 | 5.6 |

EXAMPLE XI

To a 1-liter, stirred, heated, 316 stainless steel pressure vessel was added 27.2 grams of triethanolamine, 69.6 grams of 99.5 percent glycerol, 405.7 grams of tetrabromophthalic anhydride, and 200 grams of propylene oxide. The vessel was then sealed, heated to 80°-90° C. and maintained in this temperature range for 2¾ hours. Then the excess pressure was vented, and the product recovered. The product was orange in color, weighed 600 grams, had a bromine content of 46.6 percent by weight and a theoretical equivalent weight of 211.

A mixture was made of 20.4 grams of the above polyol, 36.3 grams of the hydroxypropylated Mannich condensate of 105.5 equivalent weight, prepared as in Example II B, 0.7 grams of a block copolymer of polydimethylsiloxane and polyoxyethylene, and 17.5 grams of fluorotrichloromethane. Then 63.4 grams of polymethylene polyphenylisocyanate were rapidly stirred in. The mixture creamed in 15 seconds and had a rise and tack-free time of 120 seconds. The core density was 2.14 pounds per cubic foot, and the flame-penetration time was 120 seconds per inch. The volume expansion on aging for 2 weeks at 67° C. in a closed 1-gallon can having water on the bottom was 4.1%.

EXAMPLE XII

To a 1-liter, stirred, heated, 316 stainless steel pressure vessel was added 71.5 grams of trimethylolpropane, 11.0 grams of an unpurified adduct of maleic anhydride and dicyclopentadiene, and 195 grams of propylene oxide. The vessel was sealed and heated to 130°–140° C. and maintained in this temperature range for 3 hours. Then the excess pressure was vented, and the product recovered. This product weighed 228.5 grams, and the viscosity was about 1 million centipoises at 25° C.

21.5 grams of this polyol was dissolved in 41.2 grams of carbon tetrachloride and the solution was cooled. Then 10.8 grams of bromine were slowly added with stirring while cooling to keep the temperature at about 30°–35° C. The mixture was allowed to stand overnight, and then vacuum stripped to a weight of 31.8 grams. The bromine content of the product was about 32 percent by weight and theoretical equivalent weight was 212.

A mixture was made of 22.2 grams of the above bromine adduct, 16.6 grams of the hydroxypropylated Mannich condensation product of 105.5 equivalent weight, prepared as in Example II B, 0.2 grams of a 20 percent solution of triethylene diamine in dimethylaminoethanol, 0.4 grams of a block copolymer of polydimethylsiloxane and polyoxyethylene, and 12.2 grams of fluorotrichloromethane. Then 38.9 grams of polymethylene polyphenylisocyanate were rapidly stirred in. The mixture creamed in 25 seconds, had a tack-free time of 150 seconds, and a rise time of 210 seconds. The foam had a core density of 2.00 pounds per cubic foot, and a flame-penetration time of 81 seconds per inch.

EXAMPLE XIII

A mixture was made from 29.2 grams of the bromine-containing 205 equivalent-weight triol of Example III C-1, 3.2 grams of pentakishydroxylpropyldiethylene triamine, 24.9 grams of the hydroxypropylated Mannich condensation product having an equivalent weight of 105.5, prepared as in Example II B, 0.7 grams of a block copolymer of polydimethylsiloxane and polyoxyethylene, and 17.6 grams of fluorotrichloromethane. Then 62.3 grams of polymethylene polyphenylisocyanate were rapidly stirred in. The mixture creamed in 30 seconds and had a rise and tack-free time of 190 seconds. The core density of the foam was 1.99 pounds per cubic foot, and the flame-penetration time was 70 seconds per inch.

EXAMPLE XIV

Into a 500 ml. 3-necked flask fitted with heater, thermometer, nitrogen purge, take-off condenser, and stirrer was placed 70.0 grams of 99.5 percent glycerol, 155.5 grams of Chlorendic anhydride, and 29.2 grams of adipic acid. The mixture was heated to a temperature of 160° C. over a period of 2 hours, while maintaining a nitrogen purge. The temperature was then maintained at about 160°–165° C. for 12 hours, with nitrogen purge. Then a water-pump vacuum was applied to the mixture and the temperature maintained at 160°–170° C. for 5 hours. The resulting polyol had an acid number of 5, was amber in color, and was solid at room temperature. The weight was 231.8 grams, and the theoretical equivalent weight was 155.

A fluid mixture was prepared by heating together 27.0 grams of the hydroxyalkylated Mannich condensation product of Example IIB, and 27.2 grams of the above product. Then the mixture was cooled, and 0.6 grams of a 20 percent solution of triethylene diamine in dimethylaminoethanol, 0.5 grams of polyoxyethylene-dimethylsiloxane block copolymer, and 15.5 grams of fluorotrichloromethane were stirred in. Then 63.5 grams of polymethylene polyphenylisocyanate were rapidly mixed in. The foam had a rise and tack-free time of 1 minute. The resultant foam had good flame retardance, and excellent dimensional stability.

This Example was repeated, using 186.3 grams of tetrabromophthalic anhydride in place of the Chlorendic anhydride. The product weighed 270.1 grams, was less viscous than the Chlorendic anhydride product, and had a theoretical equivalent weight of 180, and a bromine content of 47 percent by weight. When this polyol, 31.4 grams, was substituted into the foam formulation of this Example, a foam having excellent flame penetration time and dimensional stability resulted.

EXAMPLE XV

Into a 1,000 ml. 3-necked flask fitted with heater, thermometer, nitrogen purge, take-off condenser, and stirrer was placed 130.3 grams of dipropylene glycol, 161.1 grams of trimethylolpropane, and 430.2 grams of tetrachlorophthalic anhydride. The mixture was heated to a temperature of 165° C. over a period of 2 hours, while maintaining a nitrogen purge. The temperature was then maintained at about 170° C. for 12 hours, with nitrogen purge. Then a water-pump vacuum was applied to the mixture and the temperature maintained at 165°–170° C. for 6 hours. The resulting polyol had an acid number of 4, was amber in color, and had a viscosity of several million centipoises at about 30° C. The weight was 668.9 grams, and the theoretical equivalent weight was 253. The chlorine content was 32 percent by weight.

When this polyol, 44.3 grams, was substituted into the foam formulation of Example XIV in place of the Chlorendic anhydride polyol, a foam was formed which had good flame retardancy and moderately good dimensional stability.

EXAMPLE XVI

Into a 1000 ml. 3-necked flask fitted with heater, thermometer, nitrogen purge, air-cooled reflux condenser, and stirrer was placed 192.3 grams of trimellitic anhydride and 441.1 grams of 2,2-dimethyl-1,3-hexanediol. The mixture was heated to a temperature of 175° C. over a period of 2½ hours, while maintaining a nitrogen purge. The temperature was then maintained at about 175°–180° C. for a period of 15 hours, with a slow rate of nitrogen purge, and with a slow reflux rate while removing most of the distilling water of condensation. Then the purge and reflux were discontinued, and a water-pump vacuum was applied to the mixture and the temperature maintained at about 180° C. for 6 hours. The resulting polyol had an acid number of about 5, was pale colored, and had a viscosity of approximately a million centipoises at room temperature. The weight was 596.4 grams, and the theoretical equivalent weight was 199.

When this polyol, 35.3 grams, was substituted into the foam formulation of Example XIV in place of the Chlorendic anhydride polyol, a foam was formed which was nearly self extinguishing after removal of an igniting flame, and which had excellent resistance to water absorption.

I claim:
1. A flame-retardant polyurethane composition which comprises the reaction product of (A) an organic polyisocyanate having at least two isocyanato groups with (B) a polyol component with an average hydroxyl functionality of from two to ten and an average number-average molecular weight ranging from 300 to 1250, said polyol component being the reaction product of
   1. a saturated lower aliphatic terminal monoepoxide of from two to six carbon atoms,
   2. a cyclic monoanhydride of an organic dicarboxylic acid selected from the group consisting of aromatic and cycloaliphatic dicarboxylic acids having at least eight carbon atoms and from zero to six halo substituents selected from the group consisting of chloro, bromo and iodo radicals, and

3. a polymerization starter having at least three active hydrogen atoms and being selected from the group consisting of Mannich condensation products derived from the condensation of
 a. one mole of a phenolic compound,
 b. one to two moles of formaldehyde and
 c. 0.5 to two moles of a nitrogen-containing compound selected from the group consisting of lower aliphatic monoalkanolamines and lower aliphatic dialkanolamines,
oxyalkylation products of said Mannich condensation products, and admixtures of said Mannich condensation products with alcohols selected from the group consisting of aliphatic polyalcohols having from three to six carbon atoms and from three to six hydroxyl groups and aminoalcohols having from four to 12 carbon atoms and from three to six active hydrogen atoms,
said (1), (2), and (3) being coreacted in intimate admixture at a temperature of from about 50° to about 150° C. for a length of time sufficient for the reactants to copolymerize, with the molar ratios of (1) to (3) ranging from 1.5 to 10 and the molar ratios of (2) to (3) ranging from 0.1 to 1.0.

2. The polyurethane composition of claim 1 in which said polyisocyanate is a polymethylene polyphenylisocyanate.

3. The polyurethane composition of claim 1 in which said cyclic monoanhydride is tetrabromophthalic anhydride and said monoepoxide is selected from the group consisting of ethylene oxide, 1,2-propylene oxide, and 1,2-butylene oxide.

4. The polyurethane composition of claim 1 in which said cyclic monoanhydride is tetrachlorophthalic anhydride and said monoepoxide is selected from the group consisting of ethylene oxide, 1,2-propylene oxide, and 1,2-butylene oxide.

5. The polyurethane composition of claim 1 in which said cyclic monoanhydride is 1,4,5,6,7,7-hexachlorobicyclo-(2,2,1)-5-heptene-2,3-dicarboxylic acid anhydride and said monoepoxide is selected from the group consisting of ethylene oxide, 1,2-propylene oxide, and 1,2-butylene oxide.

6. The polyurethane composition of claim 1 in which said cyclic monoanhydride is 5,6,7,8,9,9-hexachloro-octahydro-5,8-methano-2,3-naphthalene dicarboxylic acid anhydride, and said monoepoxide is selected from the group consisting of ethylene oxide and propylene oxide.

7. The polyurethane composition of claim 1, in which said polyol component contains from 0.01 to 0.5 gram atoms per kilogram of a tertiary aliphatic nitrogen atom in addition to said Mannich nitrogen atoms.

8. The polyurethane composition of claim 7, with the said polyol component having a RING content of from 0.4 to 1.0 per kilogram.

9. A flame-retardant polyurethane composition which comprises the reaction product of (A) an organic polyisocyanate having at least two isocyanato groups with (B) a polyol component with an average hydroxyl functionality of from two to ten and an average equivalent weight ranging from about 90 to 250, said polyol component comprising a physical admixture of
 x. a RING-containing polyol constituent having a number-average molecular weight of from at least 300 to not more than 1,250, a hydroxyl functionality of from at least two to about seven, said RING radicals being selected from the group consisting of aromatic, heterocyclic, and partially or fully saturated cycloaliphatic cyclic hydrocarbon radicals having at least six carbon atoms and from zero to six halo substituents selected from the group consisting of chloro, bromo, and iodo radicals, and said constituent being present in an amount such as to give from 0.5 to 3.0 gram mols of said RING radicals per kilogram of said polyol component, and
 y. at least ten per cent by weight of said polyol component of a Mannich-condensation-product polyol constituent with a hydroxyl functionality of from three to seven, and equivalent weight of from 90 to 150 and from three to seven hydroxyl radicals per Mannich radical, said Mannich-condensation-product polyol constituent being selected from the group consisting of hydroxyalkylated Mannich condensation products of a phenolic compound, formaldehyde, and a nitrogen-containing compound selected from the group consisting of lower aliphatic monoalkanolamines and lower aliphatic dialkanolamines.

10. The polyurethane composition of claim 9 in which said polyisocyanate is a polymethylene polyphenylisocyanate.

11. The polyurethane composition of claim 9 in which said RING-containing polyol constituent is a hydroxyalkylated novolak having an equivalent weight of from about 155 to 190, and an average functionality of from about 2.5 to 5.0.

12. The polyurethane composition of claim 9 in which said RING-containing polyol constituent is a hydroxyalkylated condensation product of aniline and formaldehyde having an equivalent weight of from about 95 to about 150 and an average functionality of from three to five.

13. The polyurethane composition of claim 9 in which said RING-containing polyol constituent is a hydroxyalkylated formaldehyde condensation product of a mixture of a phenol and aniline having an equivalent weight of from about 100 to about 200 and an average functionality of from three to six.

14. The polyurethane composition of claim 9 in which said RING-containing polyol constituent is a hydroxyl-terminated polyester prepared by polycondensation of an acidic compound selected from the group consisting of aromatic and cycloaliphatic carboxylic acids having from three to four carboxylic acid groups and their anhydrides, and alkylene glycols having from two to eight carbon atoms.

15. The polyurethane composition of claim 9 in which said RING-containing polyol constituent is a polyester prepared by poly-condensation of an aliphatic polyalcohol with a functionality of from three to six, an acidic compound selected from the group consisting of aromatic and cycloaliphatic dicarboxylic acids and their anhydrides, and a difunctional reactant selected from the group consisting of alkylene glycols having from two to eight carbon atoms and aliphatic dicarboxylic acids having from four to 10 carbon atoms.

16. The polyurethane composition of claim 15 in which said polyol constituent has an equivalent weight of from about 100 to about 250 and said polyol component has a content of from 0.5 to 1.0 RING radicals per kilogram.

17. The polyurethane composition of claim 15 in which said acidic compound is 1,4,5,6,7,7-hexachlorobicyclo-(2,2,1)-5-heptene-2,3-dicarboxylic acid or its anhydride.

18. The polyurethane composition of claim 15 in which said acidic compound is tetrabromophthalic anhydride.

19. The polyurethane composition of claim 15 in which said acidic compound is tetrachlorophthalic anhydride.

20. The polyurethane composition of claim 15 in which said acidic compound is 5,6,7,8,9,9-hexachloro-5,8-methanooctahydro-2,3-naphthylene dicarboxylic acid anhydride.

21. The polyurethane composition of claim 9 in which said RING-containing polyol constituent is a polyester-ether prepared by copolymerization of a lower aliphatic epoxide, a cyclic dicarboxylic acid monoanhydride selected from the group consisting of aromatic and cycloaliphatic anhydrides having from eight to 14 carbon atoms and zero to six halo substituents selected from the group consisting of chloro, bromo, and iodo radicals and a polymerization starter having at least 3 active hydrogen atoms selected from the group consisting of hydroxyl, carboxyl, and sulfhydryl radicals.

22. The polyurethane composition of claim 21 in which said RING-containing polyol constituent has a functionality of from about three to six, and said polyol component contains from 0.5 to 1.0 RING radicals per kilogram.

23. The polyurethane composition of claim 22 in which said epoxide is selected from the group consisting of ethylene oxide, propylene oxide, and 1,2-butylene oxide, and said monoanhydride is 5,6,7,8,9,9-hexachloro-5,8-methanooctahydro-2,3-naphthylene dicarboxylic acid anhydride.

24. The polyurethane composition of claim 22 in which said epoxide is selected from the group consisting of ethylene oxide, propylene oxide, and 1,2-butylene oxide, and said monoanhydride is 1,4,5,6,7,7-hexachlorobicyclo-(2,2,1)-5-heptene-2,3-dicarboxylic acid anhydride.

25. The polyurethane composition of claim 22 in which said epoxide is selected from the group consisting of ethylene oxide, propylene oxide, and 1,2-butylene oxide, and said monoanhydride is tetrabromophthalic anhydride.

26. The polyurethane composition of claim 22 in which said epoxide is selected from the group consisting of ethylene oxide, propylene oxide, and 1,2-butylene oxide, and said monoanhydride is tetrachlorophthalic anhydride.

27. The polyurethane composition of claim 22 in which said (y) is an alkoxylated condensation product of 1 mole of a phenol with from 0.9 to 1.2 moles of formaldehyde and 0.9 to 1.2 moles of a nitrogen-containing compound selected from the group consisting of lower aliphatic monoalkanolamines and lower aliphatic dialkanolamines.

28. The polyurethane composition of claim 9, in which said polyol component contains from 0.01 to 0.5 gram atoms per kilogram of a tertiary aliphatic nitrogen atom in addition to said Mannich nitrogen atoms.

29. The polyurethane composition of 28, with the said polyol component having a RING content of from 0.5 to 1.0 per kilogram.

30. The polyurethane composition of claim 9 in which the said (x) constituent comprises from 50 to 90 percent by weight of the said polyol component and is selected from the group consisting of oxyalkylation products of novolaks, oxyalkylation products of aniline-formaldehyde condensates, hydroxyl-terminated condensation polyesters derived from aromatic or cycloaliphatic dicarboxylic acids or their anhydrides, and hydroxyl-terminated polyester-ethers derived from aromatic or cycloaliphatic dicarboxylic acids or their anhydrides.

31. The polyurethane composition of claim 30 in which the said (y) constituent comprises from 10 to 50 percent by weight of the said polyol component.

32. The polyurethane composition of claim 31 in which the said RING radicals are present in an amount of from 0.5 to 1.0 mols per kilogram of said polyol component, and are residues of a dicarboxylic acid selected from the group consisting of tetrachlorophthalic acid, tetrabromophthalic acid, 1,4,5,6,7,7-hexachlorobicyclo-(2,2,1)-5-heptene-2,3-dicarboxylic acid, and 5,6,7,8,9,9-hexachloro-1,2,3,4,4a,5,8,8a-octahydro-5,8-methano-2,3-naphthalene dicarboxylic acid.

33. The polyurethane composition of claim 32 in which the said RING radicals are present in an amount of from 0.5 to 0.8 mols per kilogram of polymer.

34. The polyurethane composition of claim 9 in which the said RING radical is a residue of the addition product between a halogen and a radical selected from the group consisting of tetrahydro-1,2-phenylene, methyl tetrahydro-1,2-phenylene, and (2,2,1)-bicyclo-2,3-heptenylene-5-.

35. The polyurethane composition of claim 9 in which the said polyisocyanate is polymethylene polyphenylisocyanate.

* * * * *